US009292386B2

(12) United States Patent
Kohno et al.

(10) Patent No.: US 9,292,386 B2
(45) Date of Patent: Mar. 22, 2016

(54) APPARATUS AND METHOD FOR ALLOCATING PROCESSING REQUESTS

(71) Applicant: International Business Machines Corporation, Armonk, NY (US)

(72) Inventors: Noriaki Kohno, Tokyo (JP); Hideki Nagasawa, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/217,829

(22) Filed: Mar. 18, 2014

(65) Prior Publication Data
US 2014/0317449 A1 Oct. 23, 2014

(30) Foreign Application Priority Data
Apr. 18, 2013 (JP) .................. 2013-087445

(51) Int. Cl.
*G06F 9/44* (2006.01)
*G06F 11/14* (2006.01)
*G06F 9/50* (2006.01)

(52) U.S. Cl.
CPC .......... *G06F 11/1402* (2013.01); *G06F 9/5027* (2013.01)

(58) Field of Classification Search
None
See application file for complete search history.

(56) References Cited

U.S. PATENT DOCUMENTS

| 5,282,201 A * | 1/1994 | Frank ............... G06F 9/383 370/403 |
| 2002/0065879 A1 * | 5/2002 | Ambrose et al. ............ 709/203 |
| 2004/0237103 A1 * | 11/2004 | Kondo et al. ................ 725/37 |
| 2006/0095918 A1 * | 5/2006 | Hirose ........................ 718/104 |
| 2006/0190585 A1 * | 8/2006 | Shokawa .................... 709/223 |
| 2006/0282435 A1 * | 12/2006 | Moon et al. .................. 707/10 |
| 2007/0171921 A1 * | 7/2007 | Wookey et al. ............. 370/401 |
| 2007/0180448 A1 * | 8/2007 | Low et al. ..................... 718/1 |
| 2007/0198656 A1 * | 8/2007 | Mazzaferri et al. ......... 709/218 |
| 2009/0083557 A1 * | 3/2009 | Ichikawa et al. ............ 713/310 |
| 2013/0117382 A1 * | 5/2013 | Gaddam et al. ............. 709/206 |
| 2014/0007239 A1 * | 1/2014 | Sharpe et al. ................ 726/24 |

FOREIGN PATENT DOCUMENTS

| JP | 08249269 A | 9/1996 |
| JP | 10093655 A | 4/1998 |

(Continued)

OTHER PUBLICATIONS

Kohno et al., "Apparatus and Method for Allocating Processing Requests", Japan Patent Application No. 2013-087445, filed Apr. 18, 2013.

*Primary Examiner* — Chameli Das
(74) *Attorney, Agent, or Firm* — Jinesh Patel; Douglas A. Lashmit

(57) ABSTRACT

A system stores at least one item of connection information for each of a plurality of processing systems. The system receives a request from the requesting apparatus and, in response to receiving the request, sets a status related to one item of the connection information stored in the storage unit for connection to one of the processing systems. The system transmits the received request to the one processing system by using the one item of connection information and receives a response denoting a result of the processing from the one processing system. Responsive to receiving the response, the system releases the status related to the one item of connection information, and transmits the response to the requesting apparatus.

9 Claims, 16 Drawing Sheets

(56) References Cited

FOREIGN PATENT DOCUMENTS

| | | | |
|---|---|---|---|
| JP | 2000013398 A | 1/2000 |
| JP | 2000207352 A | 7/2000 |
| JP | 2002319963 A | 10/2002 |
| JP | 2003110604 A | 4/2003 |
| JP | 2009246525 A | 10/2009 |
| JP | 2009543485 A | 12/2009 |
| JP | 2011244164 A | 12/2011 |
| WO | 0072537 A1 | 11/2000 |
| WO | 2006073865 A2 | 7/2006 |

* cited by examiner

| Resource Name | Connection Destination Name |
|---|---|
| CLQ1 | M1 |
| CLQ1 | M2 |
| ⋮ | ⋮ |
| CLQ1 | Mn |

FIG. 5

| Connection object No. | In-use Flag | In-suspend Flag | Channel Name |
|---|---|---|---|
| OBJ1 | ON | OFF | CH1 |
| OBJ2 | ON | OFF | CH2 |
| ⋮ | ⋮ | ⋮ | ⋮ |
| OBJx | OFF | OFF | CHx |

| OFF | In-use Flag |
|---|---|
| 1 | ON |
| 2 | ON |
| 3 | ON |
| 4 | ON |
| 5 | OFF |
| 6 | ON |

APPARATUS AND METHOD FOR ALLOCATING PROCESSING REQUESTS

FIELD OF THE INVENTION

The present invention relates to an apparatus and method for allocating processing requests. The present invention relates more specifically to an apparatus and method for allocating a processing request from a requesting apparatus to any one of a plurality of processing systems capable of processing the request.

BACKGROUND OF THE INVENTION

When on demand processing is performed in an environment in which processing systems for transaction processing are clustered, a method is commonly used in which requests from threads to processing systems are allocated by allocating apparatus such as a gateway. For example, in one product, a connection pool contains a plurality of connections to a function on the gateway (queue manager) for transferring messages. When messages are transferred, a transfer destination is determined by a thread acquiring a connection from the connection pool in a round-robin manner.

The technique used to select and establish a connection to a database instance via a connection pool is well known as described in International Application No. 2008-525916 (Patent Literature 1).

The technique used to establish the priority among channels using a round-robin manner is also well known as described in Laid-open Patent Publication No. 08-249269 (Patent Literature 2).

SUMMARY

Embodiments of the present invention provide a method, program product, and apparatus for allocating a request from a requesting apparatus for processing to any one of a plurality of processing systems capable of performing the processing. An apparatus stores at least one item of connection information for each of a plurality of processing systems. The apparatus receives a request from the requesting apparatus and, in response to receiving the request, sets a status related to one item of the connection information stored in the storage unit for connection to one of the processing systems. The apparatus transmits the received request to the one processing system by using the one item of connection information and receives a response denoting a result of the processing from the one processing system. Responsive to receiving the response, the apparatus releases the status related to the one item of connection information and transmits the response to the requesting apparatus.

BRIEF DESCRIPTION OF THE SEVERAL VIEWS OF THE DRAWINGS

FIG. 5 is a diagram showing an example of information in a resource/connection destination table of the embodiment.

FIG. 6 is a diagram showing an example of information in a connection object management table of the embodiment.

DETAILED DESCRIPTION

Figure 1:
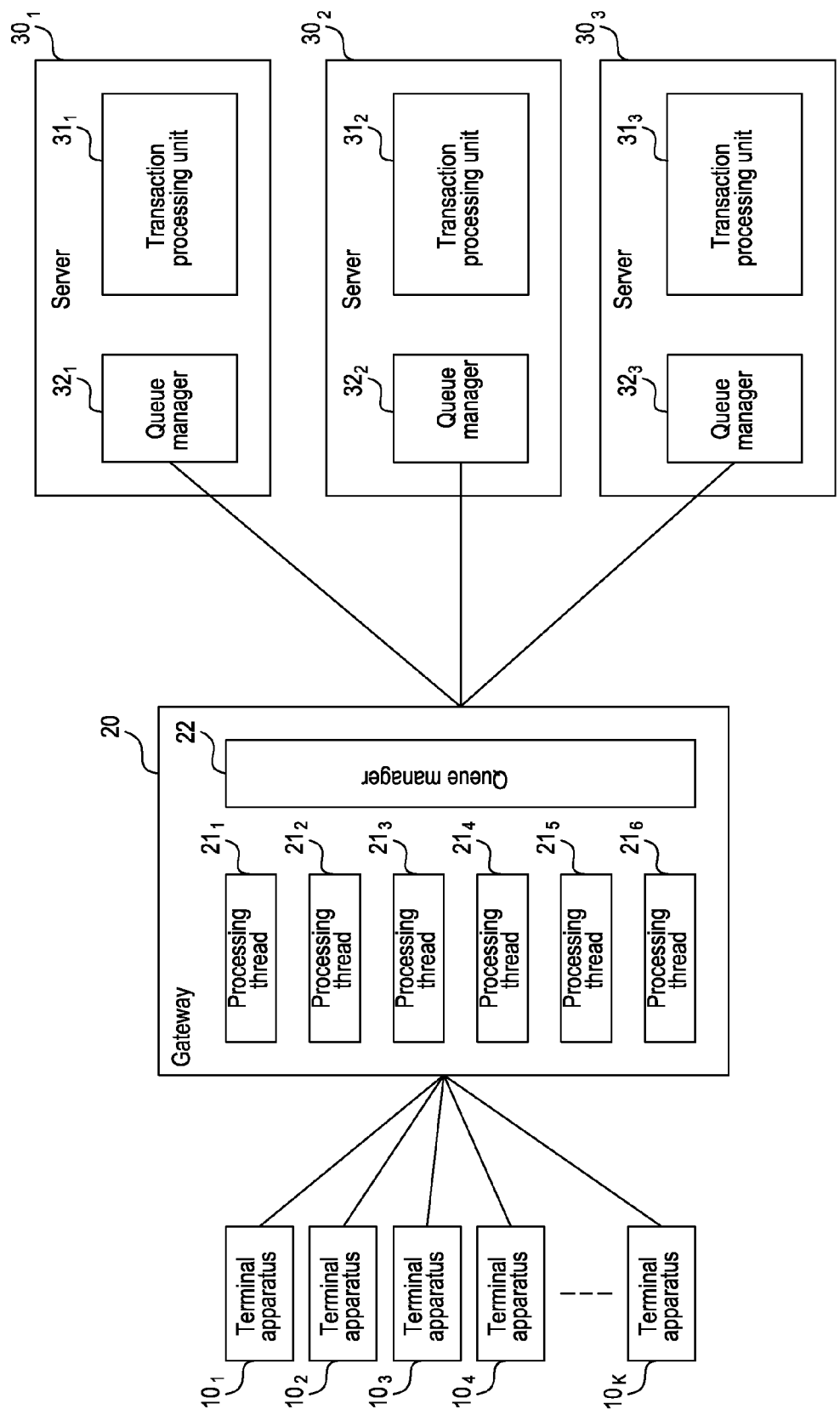
FIG. 1 is a diagram showing the prerequisite computer system configuration for an embodiment.

However, when one of the processing systems clustered in this way slows down, threads may be used up in the gateway because of waiting for a response from the slow processing system. As a result, requests can no longer be allocated to processing systems that are operating normally, and it appears the system is suffering a complete outage. This type of total system outage is referred to below as a storm drain. In the product mentioned above, a storm drain may also occur when a message is sent in round-robin manner to a transfer destination which has slowed down.

Neither Patent Literature 1 nor Patent Literature 2 provides any technical solution for lowering the possibility of such a storm drain.

It is an object of the present invention to lower the possibility of a storm drain occurring in the allocation of processing requests to a plurality of processing systems in the event a slowdown occurs in any one of the processing systems or at a time between the occurrence and detection of failure in any of the processing systems.

To achieve this object, the present invention provides an apparatus for allocating a request from a requesting apparatus making a request for processing to any one of a plurality of processing systems capable of performing the processing. The apparatus includes: a storage unit for storing at least one item of connection information for each of the processing systems for connection thereto; a request receiving unit for receiving a request from the requesting apparatus; a setting unit for setting, in response to receiving a request by the request receiving unit, a status related to one item of the connection information stored in the storage unit for connection to one of the processing systems, the status allowing the one item of connection information to be used exclusively for the request, and therefore not for any other request; a request transmitting unit for transmitting the request received by the request receiving unit to the one processing system by using the one item of connection information; a response receiving unit for receiving a response denoting a result of the processing from the one processing system; a releasing unit for releasing, when the response receiving unit receives the response, the status related to the one item of connection information, the status having allowed the one item of connection information to be used exclusively for the request, and therefore not for any other request; and a response transmitting unit for transmitting the response to the requesting apparatus when the response receiving unit has received the response.

The present invention also provides an apparatus for controlling allocation by an allocating apparatus for allocating a request from a requesting apparatus making a request for processing to any one of a plurality of processing systems capable of performing the processing. The apparatus includes: a storage unit for storing at least one item of connection information for each of the processing systems for connection thereto; a plurality of processing units each receiving a request from the requesting apparatus, transmitting the received request to one processing system by using one item of connection information, receiving a response denoting a result of the processing from the one processing system, and transmitting the response to the requesting apparatus; a setting unit for setting, in response to receiving a request by a processing unit, a status related to one item of the connection information stored in the storage unit for connection to one of the processing systems, the status allowing the one item of connection information to be used exclusively for the processing unit, and therefore not for any other processing unit; and a releasing unit for releasing, when the processing unit receives the response, the status related to the one item of connection information, the status having allowed the one item of connection information to be used exclusively for the processing unit, and therefore not for any other processing unit.

The setting apparatus disclosed herein may set, in response to the detection of failure of the processing by a certain processing system among the plurality of processing systems, a status related to each of the at least one item of connection information stored in the storage unit for connection to the processing system. The status indicates the connection information should not be used by any one of the plurality of processing units. The releasing unit may release the status related to each of the at least one item of connection information in response to the detection of resolution or mitigation of the failure of the processing by the processing systems. The status indicated the connection information should not be used by any one of the plurality of processing units.

The setting apparatus may also, when a processing unit among the plurality of processing system has not received a response from another processing unit among the plurality of the processing units within a given amount of time, set a status related to each of the at least one item of connection information stored in the storage unit for connection to the processing system. The status indicates the connection information should not be used by any one of the plurality of processing units.

Moreover, the apparatus may further include an adding unit for adding, in response to receiving a request from a processing unit when each of the at least one item of connection information stored in the storage unit is being used by any one of the plurality of processing units, to the storage unit at least one item of connection information for connection to the one processing system.

The present invention also provides a method for allocating a request from a requesting apparatus making a request for processing to any one of a plurality of processing systems capable of performing the processing. The method includes storing at least one item of connection information for each of the processing systems for connection thereto; receiving unit for receiving a request from the requesting apparatus; setting, in response to receiving a request by the request receiving unit, a status related to one item of the connection information stored in the storage unit for connection to one of the processing systems, the status allowing the one item of connection information to be used exclusively for the request, and therefore not for any other request; transmitting the request received by the request receiving unit to the one processing system by using the one item of connection information; receiving unit for receiving a response denoting a result of the processing from the one processing system; releasing, when the response receiving unit receives the response, the status related to the one item of connection information, the status having allowed the one item of connection information to be used exclusively for the request, and therefore not for any other request; and transmitting unit for transmitting the response to the requesting apparatus when the response receiving unit has received the response.

In addition, the present invention provides a program that causes a computer to function as apparatus for controlling allocation by an allocating apparatus for allocating a request from a requesting apparatus making a request for processing to any one of a plurality of processing systems capable of performing the processing. The program causes the computer to function as: a storage unit for storing at least one item of connection information for each of the processing systems for connection thereto; a plurality of processing units each receiving a request from the requesting apparatus, transmitting the received request to one processing system by using one item of connection information, receiving a response denoting a result of the processing from the one processing system, and transmitting the response to the requesting apparatus; a setting unit for setting, in response to receiving a request by a processing unit, a status related to one item of the connection information stored in the storage unit for connection to one of the processing systems, the status allowing the one item of connection information to be used exclusively for the processing unit, and therefore not for any other processing unit; and a releasing unit for releasing, when the processing unit receives the response, the status related to the one item of connection information, the status having allowed the one item of connection information to be used exclusively for the processing unit, and therefore not for any other processing unit.

In accordance with the present invention, the possibility gets lower of a storm drain occurring in the allocation of processing requests to a plurality of processing systems in the event a slowdown occurs in any one of the processing systems or at a time between the occurrence and detection of a malfunction in any of the processing systems.

The following is a detailed explanation of an embodiment of the present invention with reference to the appended drawings.

FIG. 1 is a diagram showing the prerequisite system configuration for the embodiment. As shown in the drawing, the computer system includes terminal apparatus $10_1, \ldots, 10_K$, a gateway 20, and servers $30_1, 30_2, 30_3$.

The terminal apparatus $10_1, \ldots, 10_K$ are computer apparatuses requesting transaction processing via the servers $30_1$, $30_2$, $30_3$. In the present embodiment, the terminal apparatus 10 is one example of a requesting apparatus which requests processing.

The gateway 20 is a computer apparatus that allocates transaction processing requests from the terminal apparatus $10_1, \ldots, 10_K$ to servers $30_1$, $30_2$, $30_3$ so the transaction processing by the servers $30_1$, $30_2$, $30_3$ can be utilized by the terminal apparatus $10_1, \ldots, 10_K$ using various types of protocols. Processing threads $21_1, \ldots, 21_6$ are operated to process the requests for transaction processing from the terminal apparatus $10_1, \ldots, 10_K$. The gateway 20 provided in the present embodiment is one example of an allocating apparatus for allocating processing requests.

The servers $30_1$, $30_2$, $30_3$ are computer apparatuses that process transactions in a cluster environment in which the servers work together as a single server, including a transaction processing unit $31_1$, $31_2$, $31_3$, respectively, for processing transactions. The servers $30_1$, $30_2$, $30_3$ provided in the present embodiment are one example of a plurality of processing systems.

The gateway 20 includes a queue manager 22, which is a group of system processes of messaging middleware, and the servers $30_1$, $30_2$, $30_3$ include a queue manager $32_1$, $32_2$, $32_3$, respectively, which are groups of system processes of messaging middleware, so that the gateway 20 and the servers $30_1$, $30_2$, $30_3$ can be linked by messaging middleware to transfer messages via asynchronous communication using a message queuing model. An example of messaging middleware that can be used herein is WebSphere™ MQ from IBM. (WebSphere is a registered trademark of International Business Machines Corporation.)

While terminal apparatus $10_1, \ldots, 10_K$ are shown in the drawings, it is noted these are referred to in the explanation as terminal apparatus 10 when there is no need to differentiate one from another. Although the number of terminal apparatus 10 in the following explanation is K, any number of terminal apparatus may be provided. While processing threads $21_1, \ldots, 21_6$ are shown in the drawings, it is noted these are referred to in the explanation as processing thread 21 when there is no need to differentiate one from another. Although the number of processing threads 21 in the following explanation is six, any number of processing threads may be operated. In addition, while servers $30_1$, $30_2$, $30_3$, transaction processing units $31_1$, $31_2$, $31_3$, and queue managers $32_1$, $32_2$, $32_3$ are shown in the drawings, it is noted these are referred to in the explanation as server 30, transaction processing unit 31 and queue manager 32, respectively, when there is no need to differentiate one from another. Although there are three servers 30, three transaction processing units 31, and three queue managers 32, any number of these units may be provided.

One example of a system configuration is a bank system in which the terminal apparatus 10 are automatic teller machines (ATMs), the gateway 20 is a hub, the hub is connected to the ATMs using a Simple Object Access Protocol (SOAP), and the hub is linked to the transaction processing units 31 by messaging middleware.

Figure 2:
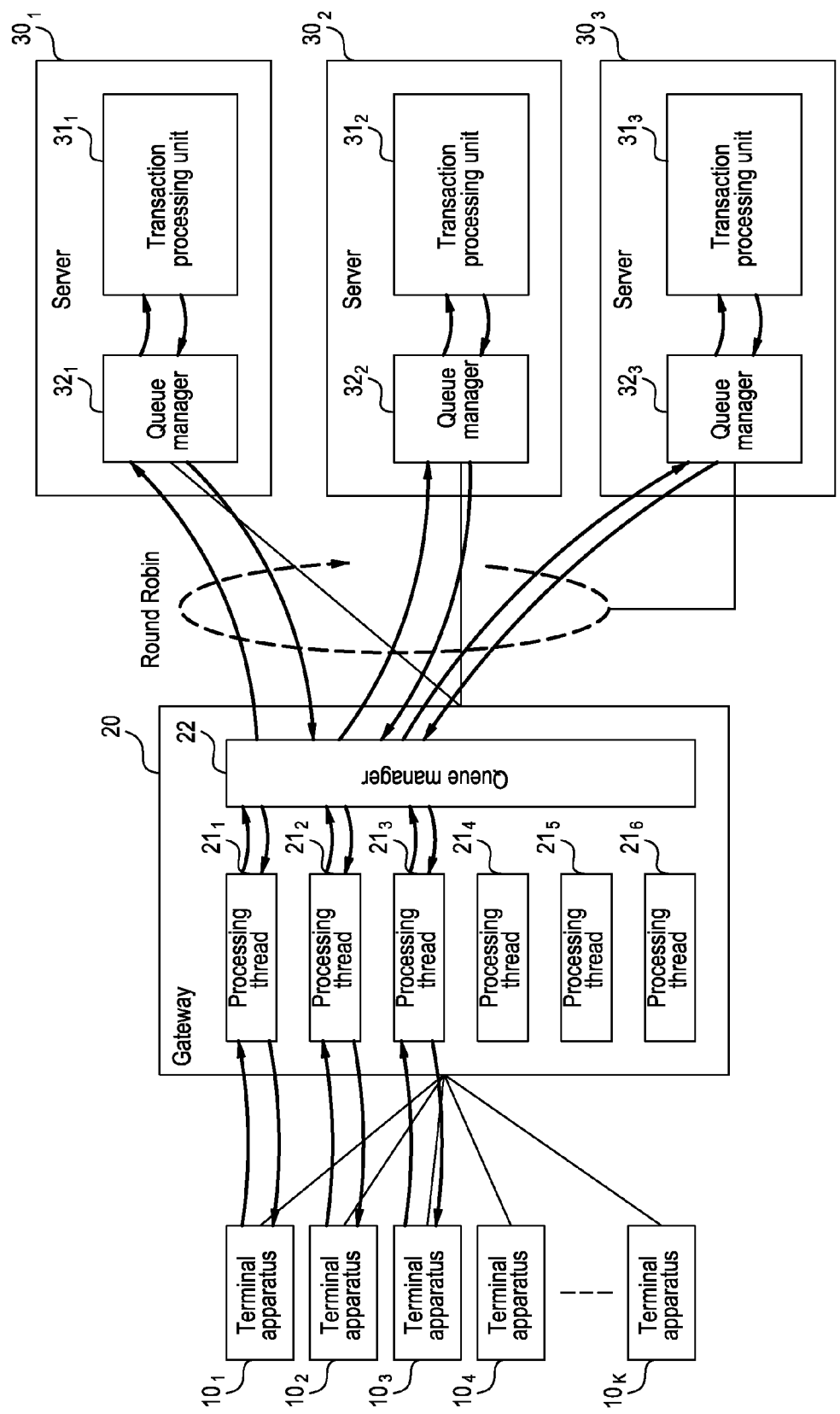
FIG. 2 is a diagram showing the normal processing operations performed in the computer system of the embodiment.

FIG. 2 is a diagram showing the normal processing operations performed in the computer system of FIG. 1.

As shown in the drawing, a terminal apparatus 10 sends a transaction processing request to the gateway 20, and the gateway 20 sends the request to a server 30 as a message for the messaging middleware. Conventionally the requests are allocated in a round-robin manner. When on demand processing is performed using a combination of SOAP communication and asynchronous communication via messaging middleware, a process proceeds on the gateway 20 in a way that the processing thread 21, accepting a request from a terminal apparatus 10 via SOAP, transmits the request to a server 30 via the queue manager 22, and the processing thread 21, accepting a response from the server 30 via the queue manager 22, returns the response via SOAP to the terminal device 10.

Figure 3:
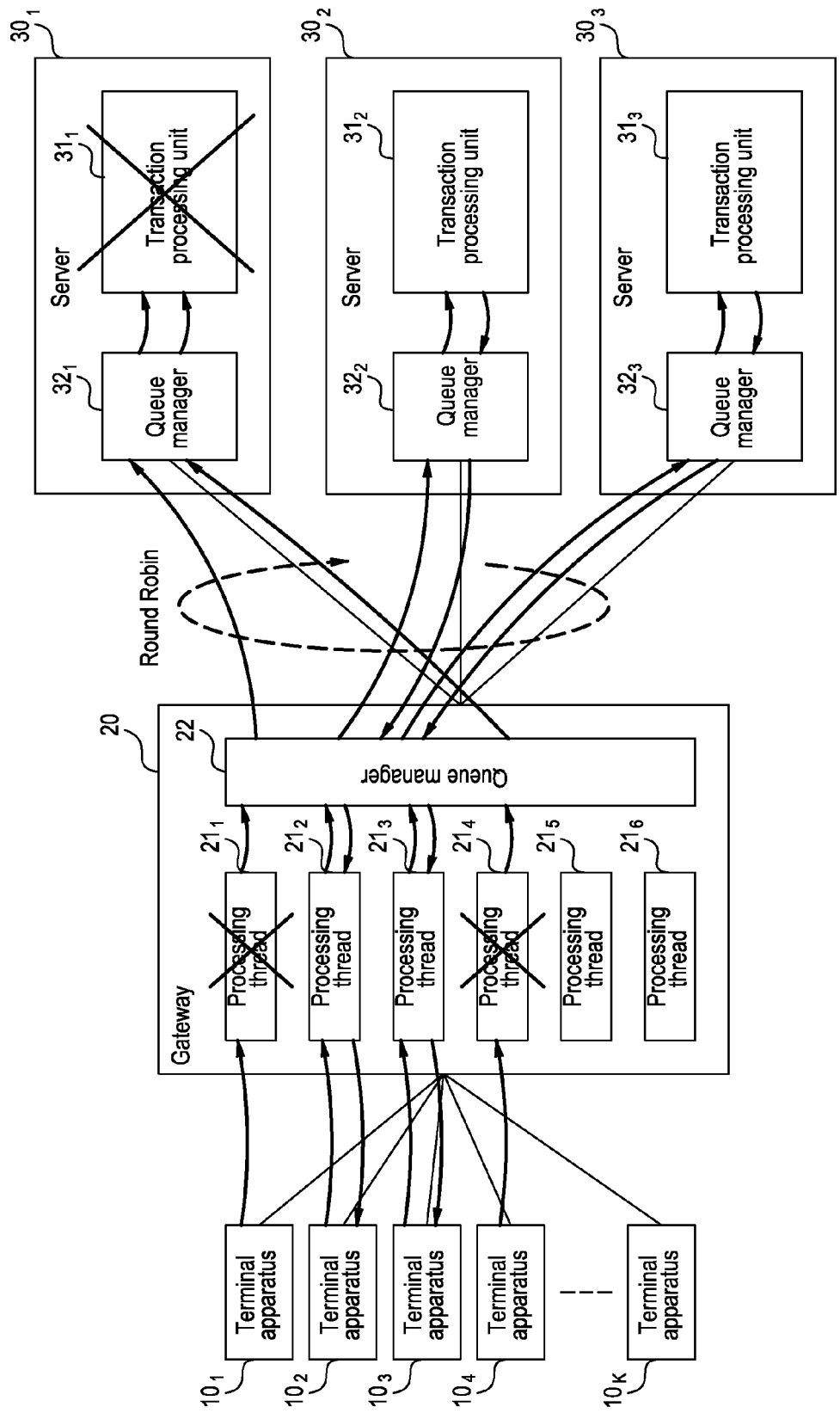
FIG. 3 is a diagram showing what occurs in the computer system of the embodiment when a server slows down and a storm drain occurs.

FIG. 3 is a diagram showing what occurs in the computer system of FIG. 1 when a server 30 slows down and a storm drain occurs.

As shown in the drawing, it is assumed that server $30_1$ among the servers $30_1$, $30_2$, $30_3$ constituting the cluster has slowed down. Because a response to the request allocated to server $30_1$ is delayed, processing threads $21_1$, $21_4$ in the gateway 20 communicating with the server $30_1$ remain occupied. As new requests continue to be sent by terminal apparatus 10 in such a situation, one processing thread 21 is occupied each time a request is allocated in the round-robin manner to the server $30_1$ suffering a slowdown. In the drawing, because processing threads $21_2$, $21_3$ communicate with properly functioning servers $30_2$, $30_3$, they are released as soon as a response is returned. However, once processing thread $21_2$ communicates with server $30_1$, no response comes back. As a result, processing thread $21_2$ remains occupied. Eventually, all of the processing threads 21 in the gateway 20 get occupied in this way. As a result, the system suffers a complete outage as no new requests are accepted despite the fact that most servers 30 are functioning properly. This phenomenon is known as a storm drain, meaning it is like a situation where a drain gets clogged and rain overflows.

The following is a consideration of the conditions under which a storm drain occurs. A storm drain occurs when a server 30 slows down or fails in a server 30 during high-volume transaction processing in a cluster environment using a plurality of servers 30 as cluster members.

For example, 600 ATM transactions occur each second in a bank system, and each transaction is usually completed in approximately 0.2 seconds when viewed from the gateway 20. In this situation, the average number of processing threads 21 required by the gateway 20 is 120 (=600×0.2), but approximately 1200 processing threads 21 should be prepared in the gateway 20 to provide a sufficient margin.

Under these conditions 1200 processing threads 21 are prepared in the gateway 20 and the processing is performed in a cluster environment including three servers 30. When one of the servers 30 slows down, 200 threads, one-third of 600 threads each second, will be assigned to the server 30 that has slowed down. Therefore, 1200 (=200×6) processing threads 21 are occupied for six seconds of slowdown. These processing threads 21 cannot accept new requests from ATMs, and thus a storm drain occurs.

In other words, when a connection is established using synchronous communication via SOAP and asynchronous communication via messaging middleware for allocating messages using a round-robin manner, a storm drain occurs if a condition where "transaction rate/number of cluster members×slowdown time>number of processing threads in gateway" is satisfied. This condition is likely to occur during high-volume transaction processing.

Also, a certain amount of time is usually required to detect the failure and disconnect from the cluster the server 30 when the malfunction is stopping. Because it is very difficult to detect the failure in six seconds, the condition for storm gets satisfied when the server 30 has not been disconnected in time. In this way a complete system outage possibly happens.

A storm drain is a problem that is likely to occur in a system performing high-volume transaction processing using a linkage of synchronous processing and asynchronous processing via messaging middleware. Storm drain is a fatal defect for a system requiring a high degree of reliability such as bank systems.

In the present embodiment, this problem is solved by a transmission destination fixed-connection pool function, enhanced by a connection exclusion function in the event of channel-failure, and connection exclusion function in the event of timeout.

The transmission destination fixed-connection pool function will be explained first. With the transmission destination fixed-connection pool function, fixed connections for transmission destination servers 30 are stored in a pool and put to heavy use. When a transmission destination server 30 slows down, the connection to the server 30 is not returned to the pool. This effectively prevents storm drains.

More specifically, a transmission destination server 30 is decided for each connection when connections in the gateway 20 are stored in the pool. In this way, a plurality of connections with different servers 30 fixed as their destination are stored in the pool. When a request is transmitted to a server 30, the gateway 20 acquires a connection from the pool, sends the request to the server 30 fixed as the destination of the connection, and awaits a response.

When a server 30 slows down, a response to a request allocated to that server 30 is delayed, the connection remains in use, and the connection is not returned to the pool. This way the connection is not reused. Only connections to servers 30 not suffering a slowdown are returned to the pool. Thus, new requests are transmitted to servers 30 not suffering a slowdown, and a storm drain can be avoided accordingly.

For example, as mentioned above, when 600 ATM transactions occur each second in a bank system with a cluster environment including three servers 30, and each transaction is usually completed in approximately 0.2 seconds when viewed from the gateway 20, the average number of connections normally required is 120 (=600×0.2).

To provide a margin of 50%, 180 connections are stored in the pool. Thus, 60 connections are stored in the pool for one server 30.

When a slowdown occurs at a server 30, the 60 connections with the server 30 as their destination remain in use and are not returned to the pool. Because the remaining 120 connections have properly functioning servers 30 as their destination, they are reused by way of the pool. In this way, the processing performed by the properly functioning servers 30 can continue.

It is noted, in this situation, 60 transactions fail when a slowdown occurs; however, as mentioned above, 1200 transactions would fail in six seconds, otherwise triggering complete system shutdown. Therefore, the approach disclosed herein can be considered as a relatively excellent storm drain prevention method. In addition to the slowdown of a server 30, a storm drain occurs when a server 30 goes down and cannot immediately report the occurrence of failure. In the present embodiment, any system that has gone down can be similarly disconnected with minimal impact.

Figure 4:
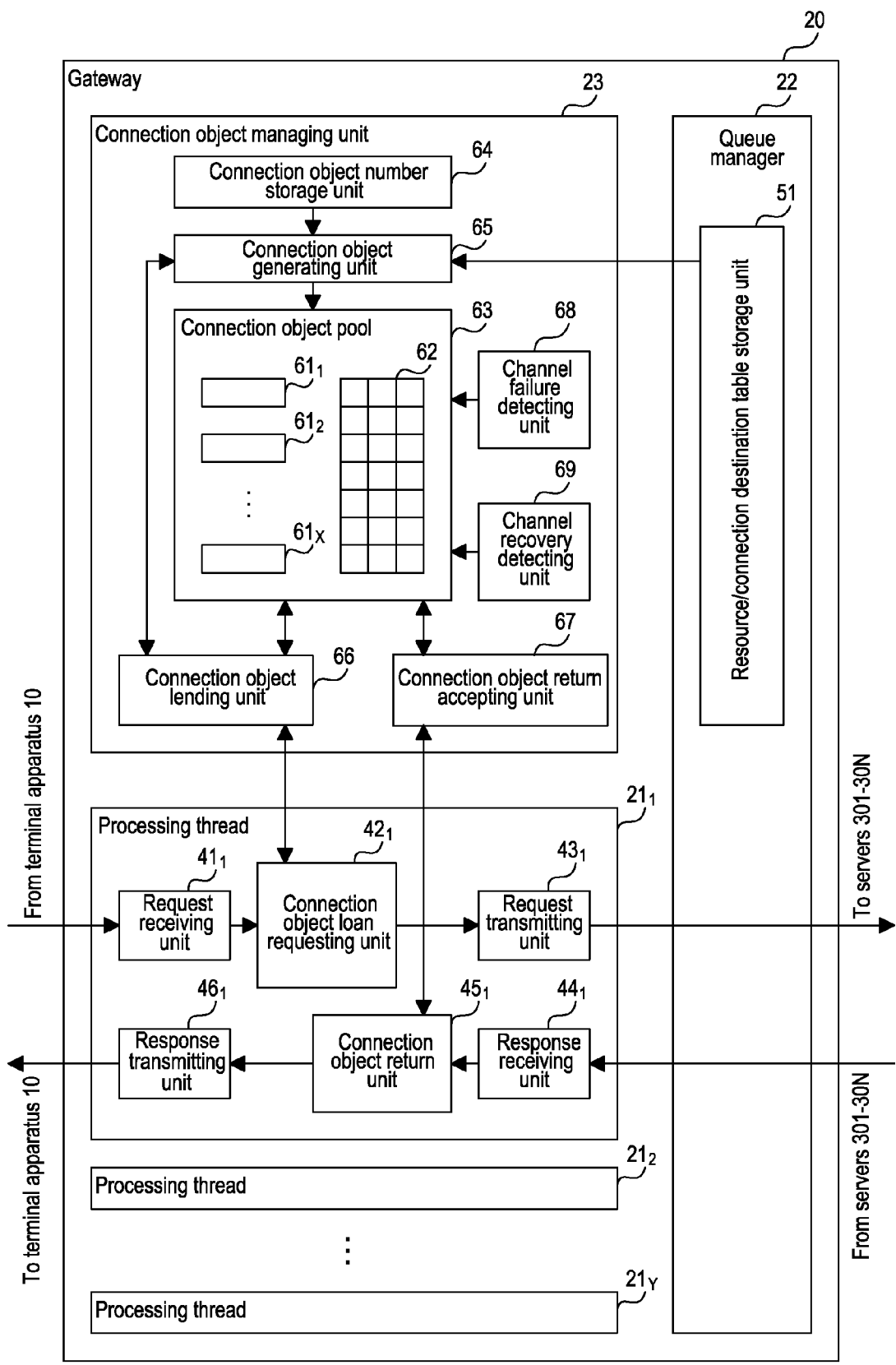
FIG. 4 is a block diagram showing an example of a configuration for the gateway in the embodiment of the present invention.

FIG. 4 is a block diagram showing the configuration of the gateway 20 in the embodiment in greater detail.

As shown in the drawing, the gateway 20 includes processing threads $21_1, \ldots, 21_Y$, a queue manager 22, and a connection object managing unit 23.

As mentioned above, the processing threads $21_1, \ldots, 21_Y$ are an example of processing units for performing processing based on processing requests from terminal apparatus 10 (not shown).

More specifically, processing thread $21_1$ includes a request receiving unit $41_1$ for receiving processing requests from terminal apparatus 10, a connection object lending requesting unit $42_1$ for requesting the lending of a connection object 61 from the connection object managing unit 23 when a request is received by the request receiving unit $41_1$, and a request transmitting unit $43_1$ for transmitting a processing request to any one of the servers $30_1, \ldots, 30_N$ (not shown) via the queue manager 22 in accordance with the connection object 61 lent by the connection object managing unit 23.

The processing thread $21_1$ also includes a response receiving unit $44_1$ for receiving a response to a processing request from one of the servers $30_1, \ldots, 30_N$ (not shown) via the queue manager 22, a connection object return unit $45_1$ for returning the connection object 61 to the connection object managing unit 23 when a response is received by the response receiving unit $44_1$, and a response transmitting unit $46_1$ for transmitting the response to the terminal apparatus 10.

Processing threads $21_2, \ldots, 21_Y$ have similar configuration, but have been omitted from the drawing.

In the drawing shown as the processing units implemented by the operation of the processing thread $21_1$ are request receiving unit $41_1$, the connection object lending requesting unit $42_1$, the request transmitting unit $43_1$, the response receiving unit $44_1$, the connection object return unit $45_1$, and the response transmitting unit $46_1$. When it is not required to specifically indicate which unit is being implemented by the operation of a certain processing thread 21, these units are simply referred to as request receiving unit 41, connection object lending requesting unit 42, request transmitting unit 43, connection object return unit 45, and response transmitting unit 46.

These function units are implemented by the combined operations of software and hardware resources. More specifically, CPU 90a (see FIG. 16) reads the program for operating the processing threads 21 from, for example, a magnetic disk device 90g (see FIG. 16) to the main memory 90c (see FIG. 16), and executes the program to implement the request receiving unit 41, connection object lending requesting unit 42, request transmitting unit 43, response receiving unit 44, connection object return unit 45, and response transmitting unit 46.

As mentioned above, the queue manager 22 is a group of system processes in the messaging middleware and provides a function for allocating loads among the servers $30_1, \ldots, 30_N$ in a round-robin manner, and a function for managing resources. More specifically, for the former function, the queue manager 22 includes a transfer queue not shown in the drawing to temporarily hold messages to be transferred. For the latter function, the manager includes a resource/connection destination table storage unit 51 for storing a resource/connection destination table used to manage the corresponding resources and connection destinations. This resource/connection destination table will be explained in greater detail below.

The connection object managing unit 23 provides a function allowing preset connection destination information to be shared by threads of the same process in order to reduce the load for connections on the queue manager 22. In this case, any local or remote connection destinations can be selected and shared. The queue manager 32 is set as a single connection destination.

More specifically, the connection object managing unit 23 includes connection objects $61_1, \ldots, 61_X$ used when connecting to a queue manager $32_1, \ldots, 32_N$, and a connection object pool 63 for storing the connection object management table 62 used when managing the connection objects $61_1, \ldots, 61_X$.

The connection object management table 62 is described below in greater detail. The connection objects $61_1, \ldots, 61_X$ are an example of at least one item of connection information for connection to a processing system.

The connection object management unit 23 includes a connection object number storage unit 64 which stores the maximum number of objects, which is the maximum number of connection objects 61 that can be stored in the connection object pool 63, and the minimum number of connection objects, which is the minimum number of connection objects 61 that should be stored in the connection object pool 63.

The connection object managing unit 23 also includes a connection object generating unit 65 which references the resource/connection destination table stored by the queue manager 22 to generate the minimum number of connection objects 61 as indicated by the number stored in connection object number storage unit 64 and, if necessary, to additionally generate connection objects 61 up to the maximum number as indicated by the number stored in connection object number storage unit 64. The function used by the connection object generating unit 65 to generate additional connection objects 61 is one example of an adding unit for adding at least one item of connection information to the storage unit.

The connection object generating unit 65 determines connection destinations for connection objects 61. This can be determined when a cluster queue is opened or when an object is written to a cluster queue. Using the former method, the connection destination is fixed when the cluster queue is opened, a message is sent to the same connection destination every time by wiring to the cluster queue, and then the cluster queue is closed. Using the latter method, a connection destination is unset when the cluster queue is opened, a different connection destination is determined each time a message is written to the cluster queue, and then the cluster queue is closed. The connection object generating unit 65 determines the connection destinations for connection objects 61 when the former method is used.

The connection object managing unit 23 also includes a connection object lending unit 66 for lending connection objects 61 in accordance with a request from the connection object lending requesting unit 42, and a connection object return accepting unit 67 for accepting the return of a connection object 61 from the connection object returning unit 45. When the connection object lending unit 66 lends a connection object 61, information indicating that the connection object 61 has been lent is written to the connection object management table 62 (in-use flag described below is set to ON). In this context the connection object lending unit 66 is one example of a setting unit for setting a status that allows one item of connection information to be used exclusively for one processing unit, and therefore not for any other processing unit. When the connection object return accepting unit 67 has accepted the return of a connection object 61, information indicating that the connection object 61 has been returned is written to the connection object management table 62 (in-use flag described below is set to OFF). In this context, the connection object accepting unit 67 is one example of a releasing unit for releasing the condition that allowed the one item of connection information to be used exclusively for the one processing unit, and therefore not for any other processing unit.

In addition, the connection object managing unit 23 includes a channel failure detecting unit 68 for detecting a channel failure between the queue manager 22 and another queue manager $32_1, \ldots, 32_N$, and a channel recovery detecting unit 69 for detecting recovery from a channel failure. Here, when the channel failure detecting unit 68 detects a channel failure, information indicating that the connection object 61 corresponding to the failed channel cannot be used is written to the connection object management table 62 (in-suspension flag described below is set to ON). In this context, the channel failure detecting unit 68 is one example of a setting unit for setting a condition that allows one item of connection information to be used exclusively for one processing unit, and therefore not for any other processing unit. When the channel recovery detecting unit 69 detects recovery from a channel failure, information indicating that the connection object 61 corresponding to the failed channel can be used is written to the connection object management table 62 (in-suspension flag described below is set to OFF). In this context, the channel recovery detecting unit 69 is one example of a releasing unit for releasing the status that allowed the one item of connection information to be used exclusively for the one processing unit, and therefore not for any other processing unit.

These function units are implemented by the combined operations of software and hardware resources. More specifically, CPU 90*a* (see FIG. 16) reads the program for operating the processing threads 21 from, for example, a magnetic disk device 90*g* (see FIG. 16) to the main memory 90*c* (see FIG. 16), and executes the program to implement the connection object generating unit 65, connection object lending unit 66, connection object return accepting unit 67, channel failure detecting unit 68, and channel recovery detecting unit 69. The connection object pool 63 and connection object number storage unit 64 can be implemented, for example, by the magnetic disk device 90*g* (see FIG. 16).

The following is a more detailed explanation of the contents of the resource/connection destination table stored in the resource/connection destination table storage unit 51.

FIG. 5 is a diagram showing an example of information in a resource/connection destination table of the embodiment.

As shown in the drawing, a resource name and a connection destination name are associated in the resource/connection destination table.

Resource names are names of the resources managed by the queue manager 22. Here, such a resource is a cluster queue, and the same resource name, i.e., "CLQ1" is registered in all entries. Here, the cluster queue is a queue included in a queue manager 32 which temporarily holds messages transferred from the transfer queue of the queue manager 22.

Connection destination names are names of connection destinations managed by the queue manager 22. Here, such a connection destination is the queue manager 32. For the entries having the same queue manager name "CLQ1", a different queue manager name such as "M1", "M2" and "M3" is registered in an entry for a different connection destination.

In the present embodiment, the messaging middleware considers queue managers 32 associated with the same cluster queue name as a logical group, and has the function of distributing the load in a round-robin manner. Registration is, therefore, made so that the queue manager 32 for queue manager names "M1", "M2" and "M3" is a target for load distribution in a round-robin manner.

The following is a more detailed explanation of the contents of the connection object management table 62 stored in the connection object pool 63.

FIG. 6 is a diagram showing an example of information in a connection object management table 62.

As shown in the drawing, connection object number, in-use flag, in-suspension flag and channel name are associated with each other in the connection object management table 62. The connection object number is a number used to identify connection objects $61_1, \ldots, 61_X$.

In-use flag is a flag used to indicate whether or not a connection object $61_1, \ldots, 61_X$ is being used by a processing thread 21. When a connection object is being used by a processing thread 21, in-use flag is set to ON. When a connection object is not being used by a processing thread 21, in-use flag is set to OFF.

In-suspension flag is a flag used to indicate whether a connection object $61_1, \ldots, 61_X$ is unavailable for some reason. When a connection object cannot be used for some reason, the in-suspension flag is set to ON. When a connection object can be used, the in-suspension flag is set to OFF. Channel name is a name of a channel between the queue manager 22 and a queue manager $32_1, \ldots, 32_N$ that is a connection destination for object $61_1, \ldots, 61_X$.

Figure 7:
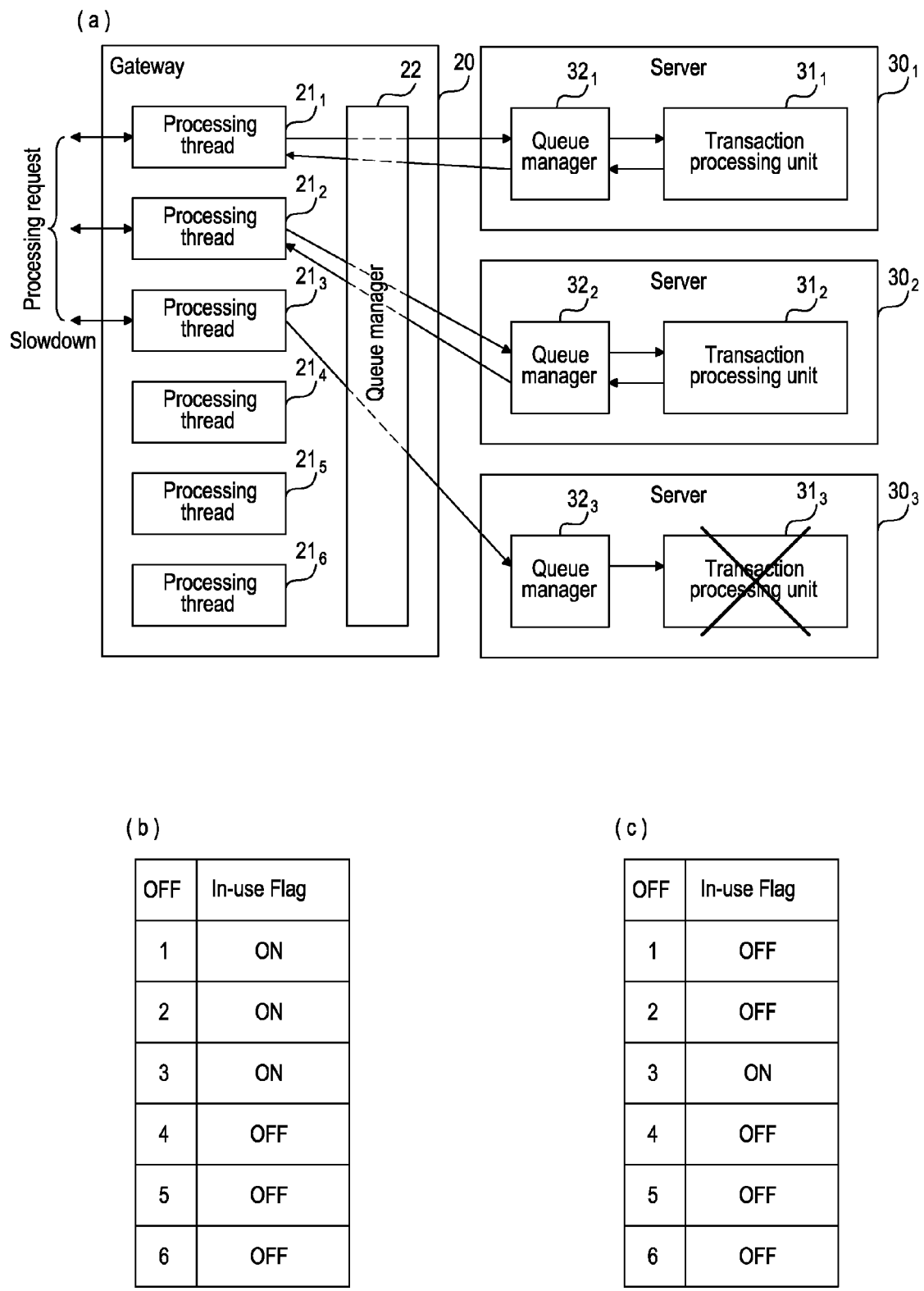
FIG. 7 is a diagram showing the operations performed and the transition in-use flag that occurs when a server has slowed down in a computer system according to the embodiment.
Figure 8:
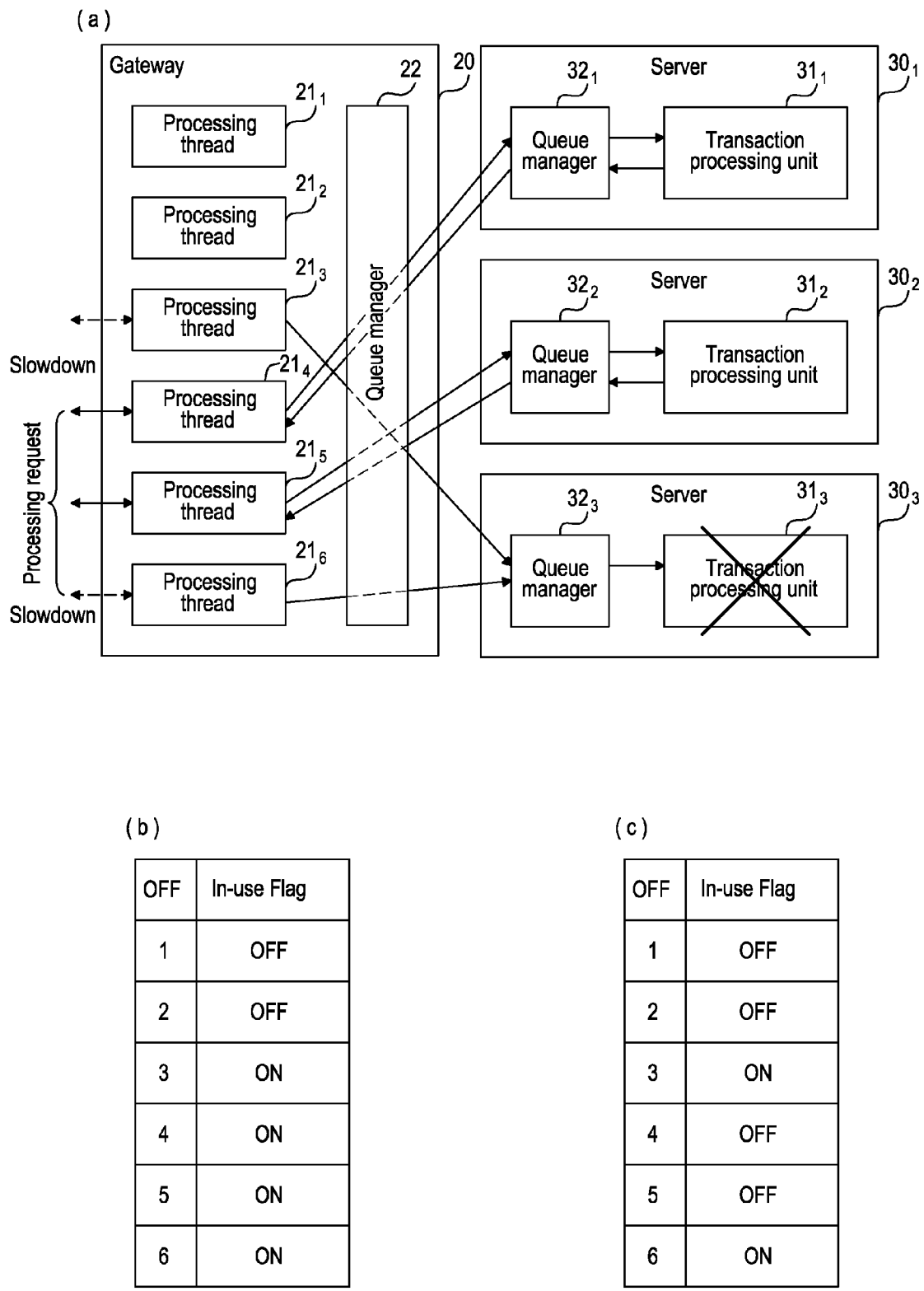
FIG. 8 is a diagram showing the operations performed and the transition in-use flag that occurs when a server has slowed down in a computer system according to the embodiment.
Figure 9:
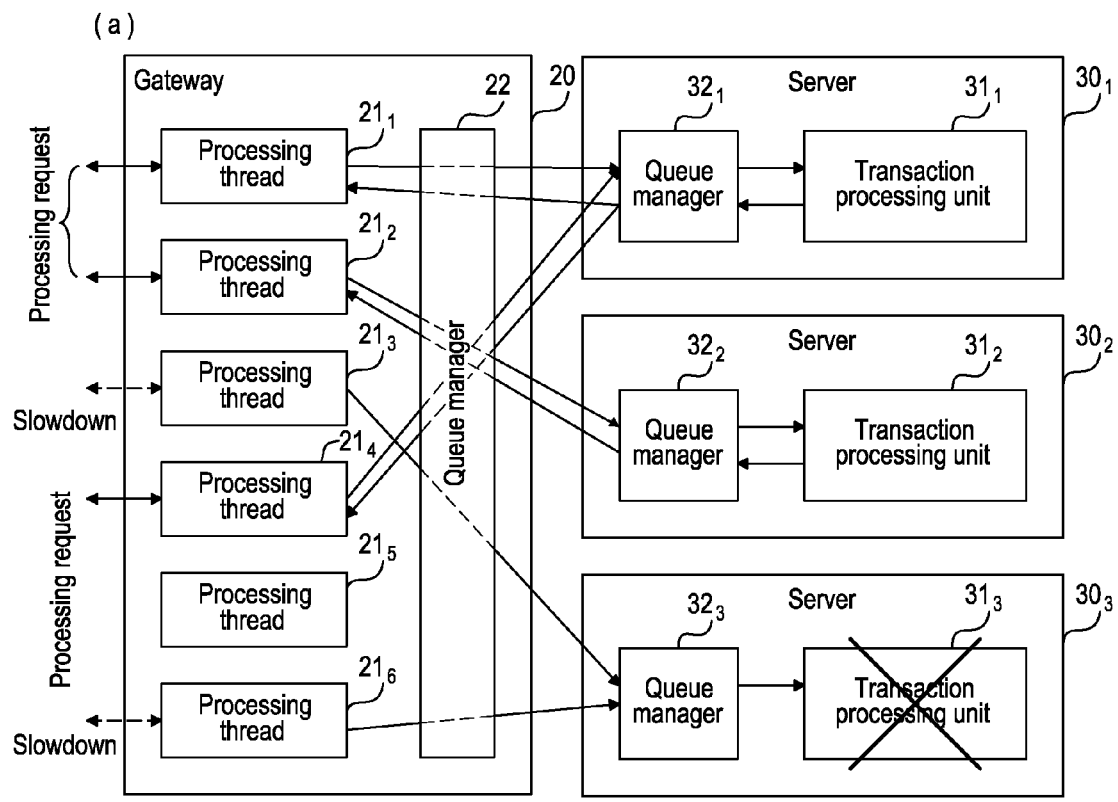
FIG. 9 is a diagram showing the operations performed and the transition in-use flag that occurs when a server has slowed down in a computer system according to the embodiment.

The following is a detailed explanation of the operations performed by the transmission destination fixed-connection pool function with reference to FIG. 7 through FIG. 9. Here, processing threads $21_1, \ldots, 21_6$ are operated on the gateway 20, and it is assumed that these processing threads 21 accept three processing requests from terminal apparatus 10 (not shown) per round. The connection objects 61 prepared for use by the processing threads $21_1, \ldots, 21_6$ are connection objects $61_1$, $61_4$ which have queue manager $32_1$ as a connection destination, connection objects $61_2$, $61_5$ which have queue manager $32_2$ as a connection destination, and connection objects $61_3$, $61_6$ which have queue manager $32_3$ as a connection destination. The numbers for connection objects $61_1$, $61_2$, $61_3$, $61_4$, $61_5$, $61_6$ are 1, 2, 3, 4, 5 and 6, respectively.

FIG. 7 is a diagram showing the operations performed and the transition of in-use flags that occurs in the first round when server $30_3$ has slowed down. In FIG. 7 (a), processing threads $21_1$, $21_2$, $21_3$ accept processing requests, connection objects $61_1$, $61_2$ and $61_3$ are used, respectively, and processing requests are transmitted to transaction processing units $31_1$, $31_2$ and $31_3$ via queue managers $32_1$, $32_2$ and $32_3$. FIG. 7 (b) shows the values of in-use flags at this time. Because unused connection objects 61 are lent to a new processing request, in-use flags for connection objects $61_1$, $61_2$ and $61_3$ are set to ON.

Also, in FIG. 7 (a), transaction processing unit $31_1$ has completed the processing, a response has been returned to processing thread $21_1$ via the queue manager $32_1$, transaction processing unit $31_2$ has completed the processing, and a response has been returned to processing thread $21_2$ via the queue manager $32_2$. However, because transaction processing unit $31_3$ has slowed down, a response cannot be returned to processing thread $21_3$.

FIG. 7 (c) shows the values of in-use flags at this time. Because a response has been returned from queue managers $32_1$ and $32_2$, and connection objects $61_1$ and $61_2$ have been returned, in-use flags for connection objects $61_1$ and $61_2$ have been reset to OFF. However, because a response has not been returned from queue manager $32_3$, and connection object $61_3$ has not been returned, in-use flag for connection object $61_3$ is not reset to OFF but remains set at ON.

FIG. 8 is a diagram showing the operations performed and the transition of in-use flags that occurs in the second round when server $30_3$ has slowed down.

In FIG. 8 (a), processing threads $21_4$, $21_5$, $21_6$ accept processing requests, connection objects $61_4$, $61_5$ and $61_6$ are used, respectively, and processing requests are transmitted to transaction processing units $31_1$, $31_2$ and $31_3$ via queue managers $32_1$, $32_2$ and $32_3$.

FIG. 8 (b) shows the values of in-use flags at this time. Because unused connection objects 61 are lent to a new processing request, in-use flags for connection objects $61_4$, $61_5$ and $61_6$ are set to ON.

Also, in FIG. 8 (a), transaction processing unit $31_1$ has completed the processing, a response has been returned to processing thread $21_4$ via the queue manager $32_1$, transaction processing unit $31_2$ has completed the processing, and a response has been returned to processing thread $21_5$ via the queue manager $32_2$. However, because transaction processing unit $31_3$ has slowed down, a response cannot be returned to processing thread $21_6$.

FIG. 8 (c) shows the values of in-use flags at this time. Because a response has been returned from queue managers $32_1$ and $32_2$, and connection objects $61_4$ and $61_5$ have been returned, in-use flags for connection objects $61_4$ and $61_5$ have been reset to OFF. However, because a response has not been returned from queue manager $32_3$, and connection object $61_6$ has not been reset, in-use flag for connection object $61_6$ is not reset to OFF but remains set at ON.

FIG. 9 is a diagram showing the operations performed and the transition of in-use flags that occurs in the third round when server $30_3$ has slowed down.

In FIG. 9 (a), processing threads $21_1$, $21_2$ and $21_4$ accept processing requests because processing thread $21_3$ is still awaiting a response. Because in-use flags for connection objects $61_3$ and $61_6$ remain set to ON, processing threads $21_1$, $21_2$ and $21_4$ use connection objects $61_1$, $61_2$ and $61_4$, and the processing requests are transmitted to transaction processing units $31_1$, $31_2$, $31_1$ via queue managers $32_1$, $32_2$ and $32_1$.

FIG. 9 (b) shows the values of in-use flags at this time. Because connection objects $61_1$, $61_2$ and $61_4$ are lent rather than connection objects $61_3$ and $61_6$ whose connection destination is the server $30_3$ that has slowed down, in-use flags for connection objects $61_1$, $61_2$ and $61_4$ are set to ON.

In this way, a complete shutdown of processing threads $21_1, \ldots, 21_6$ can be avoided.

This function excludes from allocation target server 30 connected to a channel from which a failure has been detected (including failure of connection destination server 30). When, for example, a channel disconnection is detected, the connection object 61 corresponding to the channel is no longer lent, thus minimizing thread stoppage.

Figure 10:
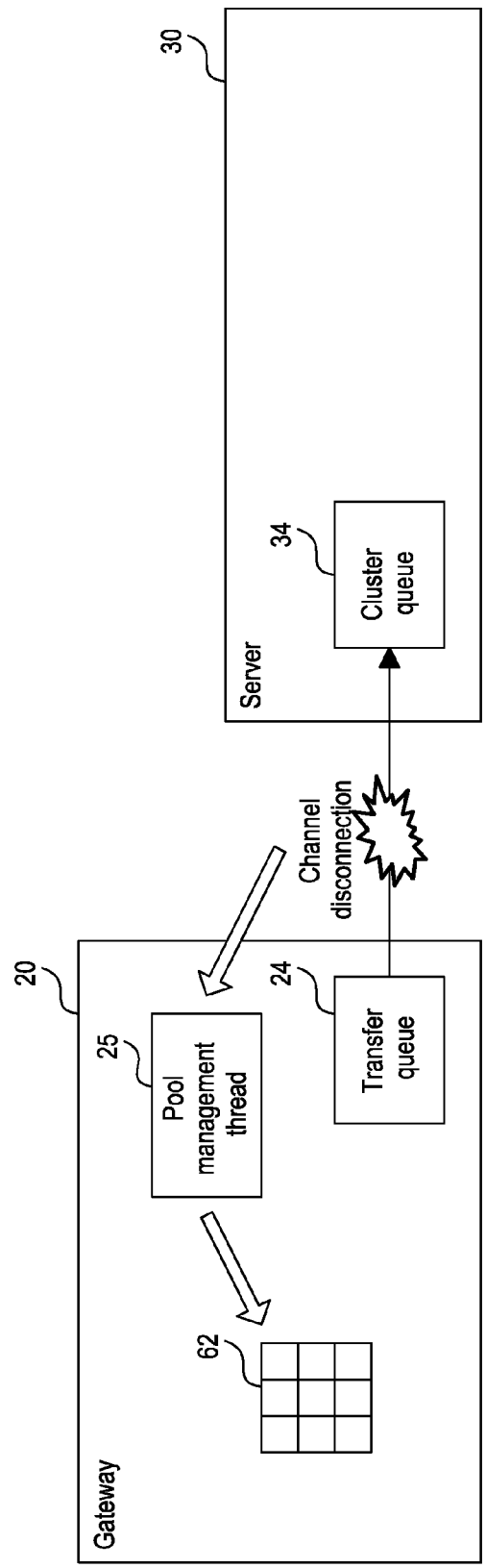
FIG. 10 is a diagram showing the connection exclusion function during a channel failure which is used when a channel disconnection has been detected in the embodiment.

FIG. 10 is a diagram schematically illustrating the connection exclusion function during such a channel failure.

When a failure has occurred in the network or a server 30, the channel connecting the transfer queue 24 to cluster queue 34 is first disconnected.

Then, the pool management thread 25 (corresponding to the channel failure detecting unit 68 in FIG. 4) in the gateway 20 receives notification that a channel disconnection has been detected, and sets to ON the in-suspension flag corresponding to the name of the channel in the connection object management table 62.

In this way, only connection objects 61 with suspension flags that have not been set to ON are lent out.

It is assumed that the channel recovers from failure afterwards. It may be that the connection destination server 30 recovers.

Then the pool management thread 25 (corresponding to the channel failure detecting unit 69 in FIG. 4) in the gateway 20 receives notification that a recovery from a channel failure has been detected, and sets to OFF the in-suspension flag corresponding to the name of the channel in the connection object management table 62.

As a result, the connection object 61 whose in-suspension flag has been set to OFF can be lent again.

This function can also be used when there is a planned shutdown (lock-out) of a server 30 in a cluster environment.

Figure 11:
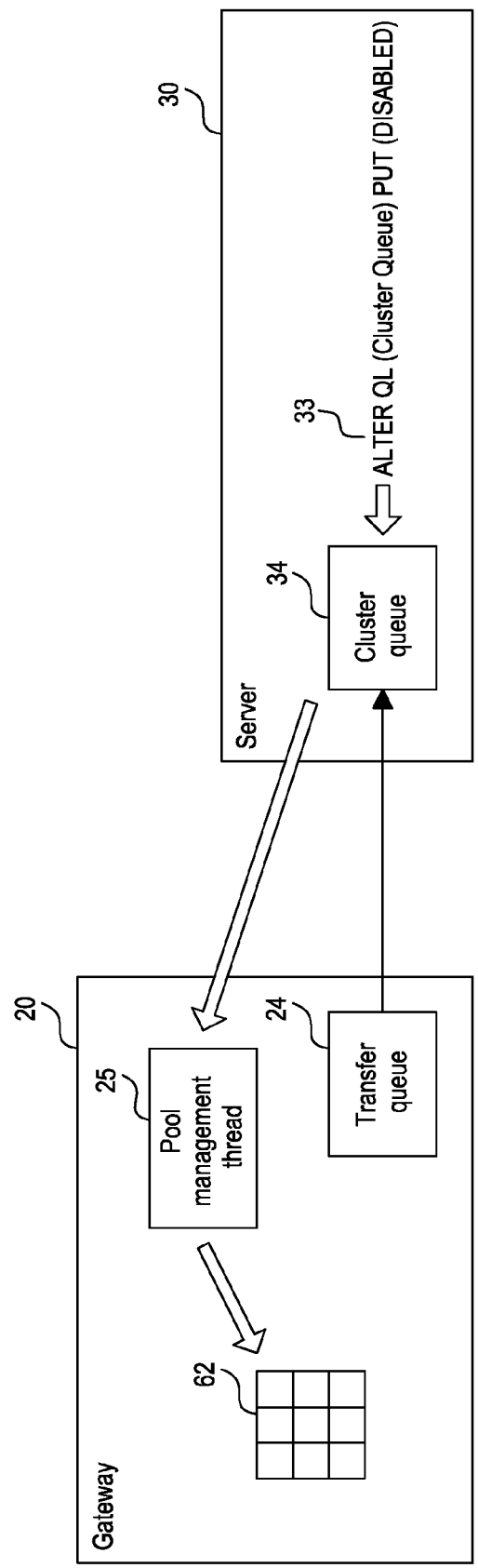
FIG. 11 is a diagram showing the connection exclusion function during a channel failure which is used when a planned server outage occurs in the embodiment.

FIG. 11 is a diagram schematically illustrating the connection exclusion function in this event.

First, when the server 30 is shut down, a command 33 is sent to change the attribute concerning message writing to the cluster queue 34 to "disabled". This attribute change is reported to the gateway 20 by the cluster queue 34.

Then, the pool management thread 25 (corresponding to the channel failure detecting unit 68 in FIG. 4) in the gateway 20 receives notification that message writing to the cluster queue 34 has been disabled, and the in-suspension flags corresponding to the connection objects 61 whose connection destination is the server 30 are set to ON in the connection object management table 62.

In this way, only connection objects 61 with suspension flags that have not been set to ON are lent.

When the lock-out of server 30 ends, the attribute related to message writing to the cluster queue 34 is set to "enabled". This attribute change is reported to the gateway 20 by the cluster queue 34.

Then, the pool management thread 25 (corresponding to the channel failure detecting unit 69 in FIG. 4) in the gateway 20 receives notification that message writing to the cluster queue 34 has been enabled, and the in-suspension flags corresponding to the connection objects 61 whose connection destination is the server 30 are set to OFF in the connection object management table 62.

In this way, the connection objects 61 whose in-suspension flags have been set to OFF can now be lent out again.

When a timeout occurs in a processing thread 21, this function excludes from allocation target server 30 connected to the processing thread 21.

Figure 12:
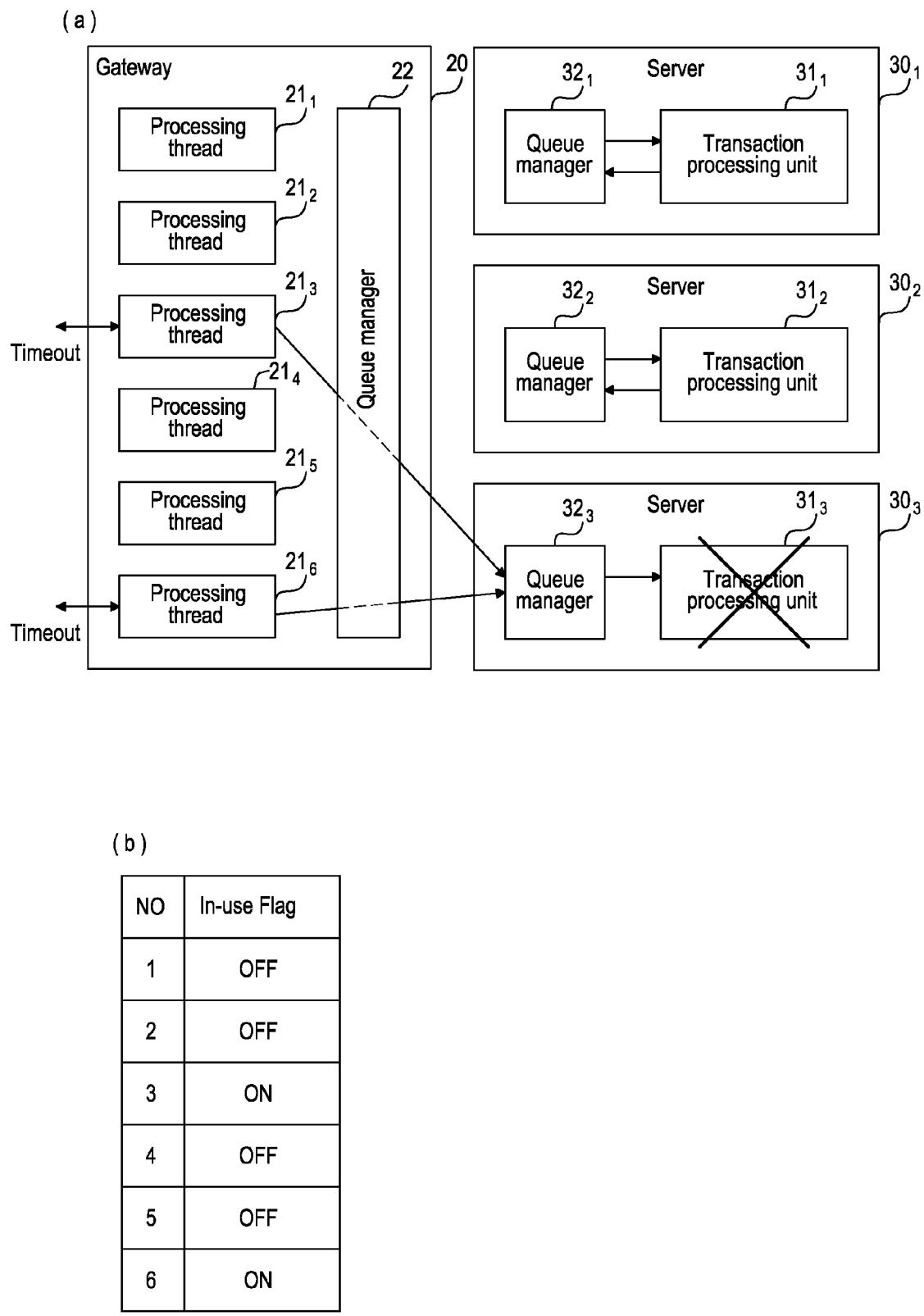
FIG. 12 is a diagram showing the connection exclusion function during timeout and the in-suspension flag in the embodiment.

FIG. 12 is a diagram showing the connection exclusion function in the event of timeout as well as the in-suspension flags in the embodiment.

As shown in FIG. 12 (*a*), it is assumed that a timeout occurs for processing threads $21_3$ and $21_6$ using connection objects $61_3$ and $61_6$ to connect to server $30_3$ that slows down. When processing threads $21_3$ and $21_6$ return connection objects $61_3$ and $61_6$, information indicating that a timeout has occurred is transmitted.

Then, as shown in FIG. 12 (*b*), the in-suspension flags corresponding to connection objects $61_3$ and $61_6$ from which timeout information has been received are set to ON, and connection objects $61_3$ and $61_6$ whose in-suspension flags have been set to ON are excluded from a group of objects to be lent out. By excluding connection objects 61 whose connection destination is a server 30 that has caused a timeout from objects to be lent out, the effect of the slowdown can be eliminated from the next round of processing.

Figure 13:
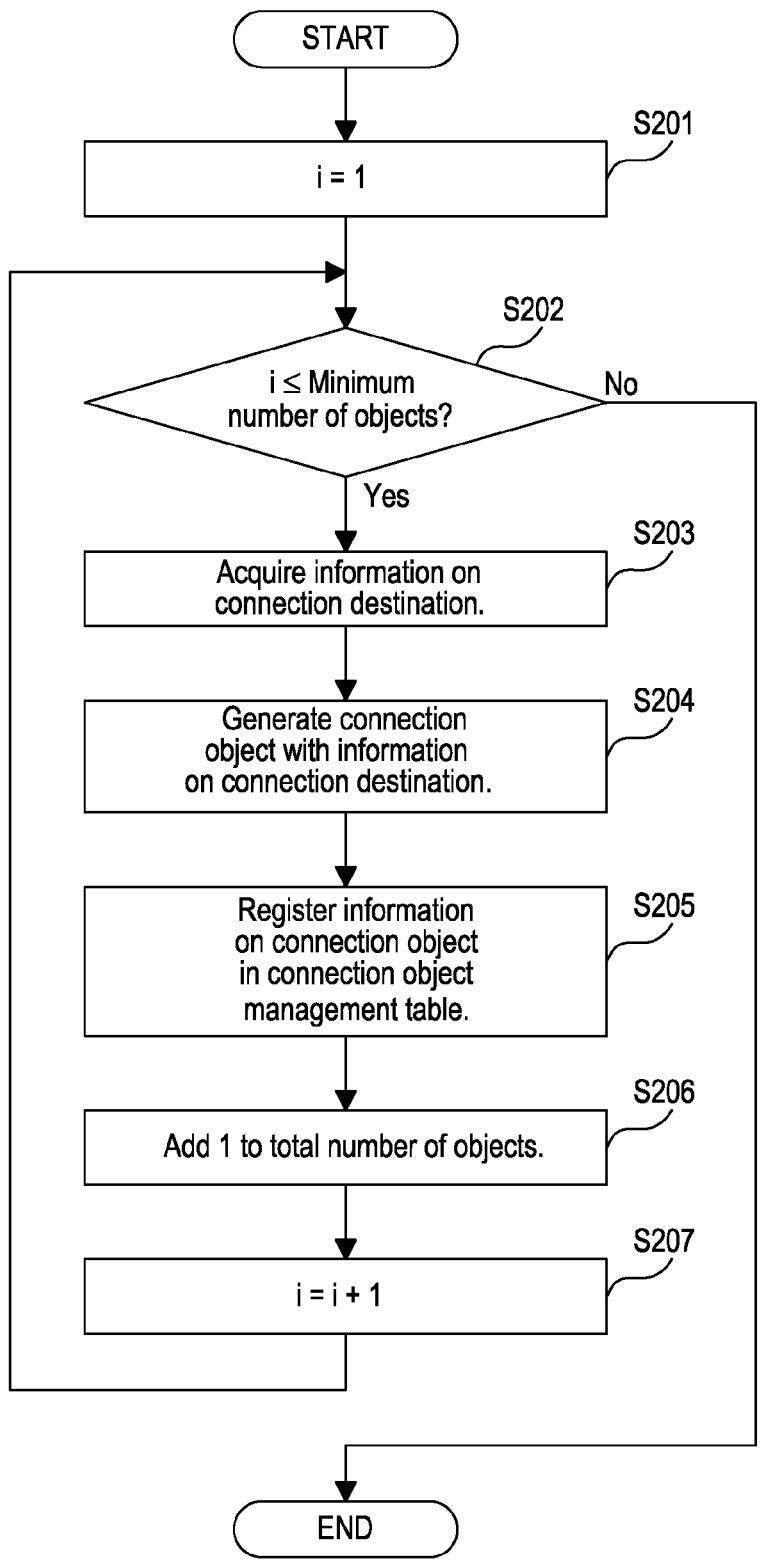
FIG. 13 is a flowchart showing the operations performed in the embodiment when the gateway initializes the connection object table.

FIG. 13 is a flowchart showing the operations performed in the embodiment when the gateway 20 initializes the connection object table 63.

When a command to initialize a connection object pool 63 is received, the connection object generating unit 65 in the gateway 20 first replaces the variable i indicating the noted connection object 61 with 1 (Step 201).

Next, the connection object generating unit 65 determines whether or not the value stored in variable i is equal to or less than the value for the minimum number of objects stored in the connection object number storage unit 64 (Step 202).

When the value stored in variable i is equal to or less than the value for the minimum number of objects, the connection object generating unit 65 acquires information on the connection destination from the queue manager 22 (Step 203). More specifically, the connection object generating unit 65 instructs the queue manager 22 to acquire the information on the connection destination by designating the cluster queue name and the way to determine the connection destination when the cluster queue as mentioned above is opened. In this way the queue manager 22 references the resource/connection destination table stored in the resource/connection destination table storage unit 51, selects a connection destination corresponding to the designated cluster queue name in a round-robin manner, and sends information on the connection destination to the connection object generating unit 65.

Next, the connection object generating unit 65 generates a connection object 61 with the information related to the selected connection destination being set (Step 204). Then, information related to the generated connection object 61 is registered in the connection object management table 62 (Step 205). More specifically, a number next to the connection object number of the immediately preceding entry is registered as connection object number. In-use flag is registered as OFF to indicate that the connection object 61 is not used by a processing thread 21, and the in-suspension flag is registered as OFF to indicate that the connection object 61 is not in a state where it is unavailable. The channel name obtained from the queue manager 22 is also registered. The connection object generating unit 65 then adds 1 to the variable s indicating the total number of connection objects 61 (Step 206).

Afterwards, the connection object generating unit 65 adds 1 to variable i (Step 207), and repeats the process from Step 202.

When the value stored in variable i exceeds the value for the minimum number of objects in Step 202, the connection object generating unit 65 ends the process.

Figure 14:
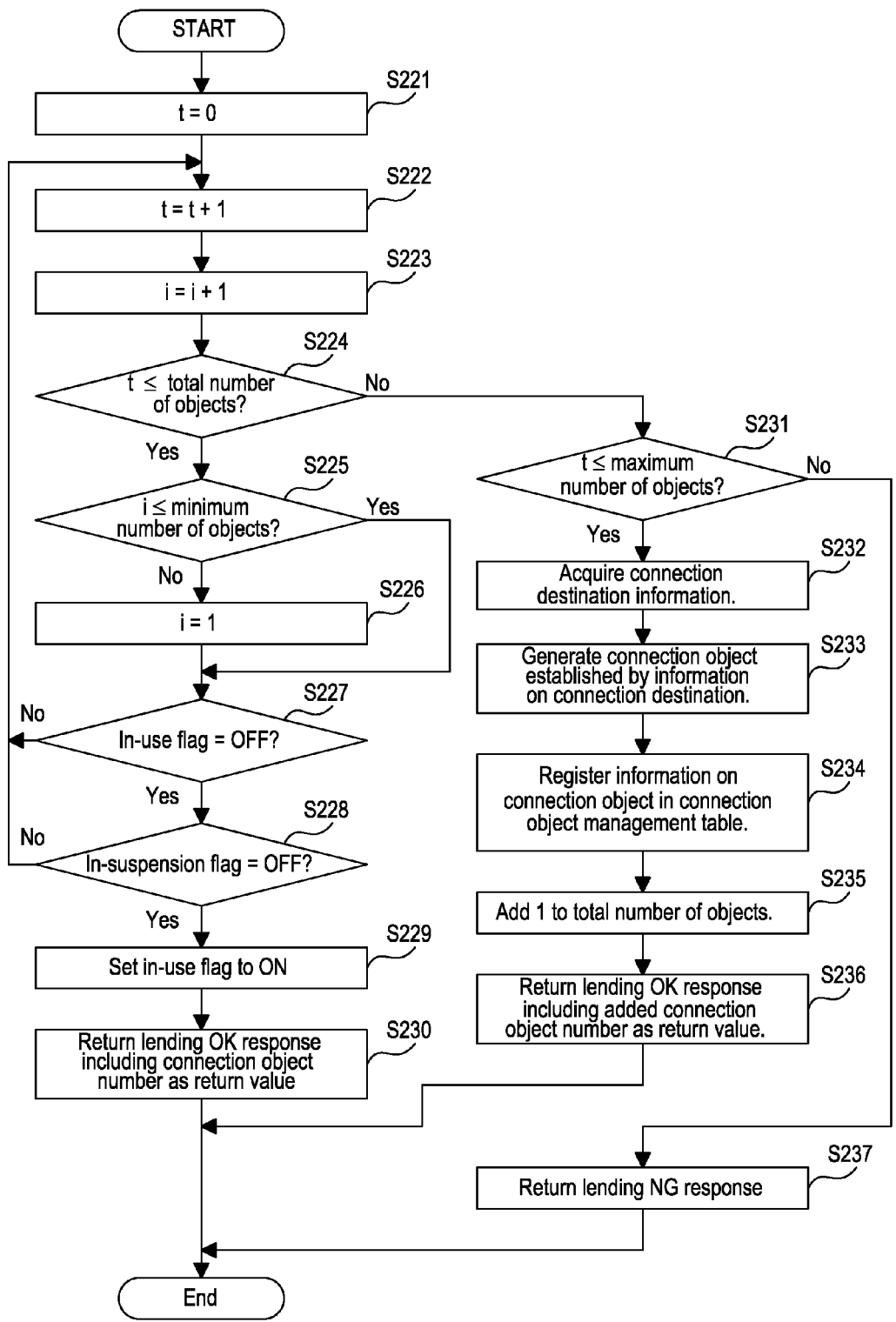
FIG. 14 is a flowchart showing the operations performed in the embodiment when the gateway lends a connection object.

FIG. 14 is a flowchart showing the operations performed in the embodiment when the gateway 20 lends a connection object 61. Prior to start of the operation, 0 is stored in the variable i indicating the noted connection object 61 immediately after the connection object pool 63 is initialized. Afterwards, the value that was set the previous time the connection object 61 was lent out is stored as it is. Also, the value stored at the end of the processing in FIG. 13 or the value after the change in Step 235 described below is stored in variable s indicating the total number of connected objects 61.

When the connection object lending requesting unit 42 requests the lending of a connection object 61, the connection object lending unit 66 first puts 0 in the variable t indicating the number of attempts (Step 221).

Also, the connection object lending unit 66 adds 1 to variable t (Step 222), and adds 1 to variable i (Step 223).

Next, the connection object lending unit 66 determines whether or not the value stored in variable t is equal to or less than the value of the total number of connection objects 61 stored in variable s (Step 224).

The following is an explanation of the process when the value stored in variable t is equal to or less than the value of the total number of connection objects 61 stored in variable t.

In this case, the connection object lending unit 66 first determines whether or not the value stored in variable i is equal to or less than the value for the total number of connection objects 61 stored in variable s (Step 225). When the value stored in variable i exceeds the value for the total number of connection objects 61 stored in variable s, 1 is put in variable i (Step 226) and the process advances to Step 227. When the value stored in variable i is equal to or less than the value for the total number of connection objects 61 stored in variable s, the process advances to Step 227 without changing the value.

Next, the connection object lending unit 66 determines whether or not in-use flag for the connection object 61 represented by variable i has been set to OFF (Step 227).

When in-use flag has not been set to OFF, that is, in-use flag has been set to ON, the connection object 61 has been lent out and cannot be lent out anew. The connection object lending unit 66 therefore repeats the process from Step 222.

When in-use flag has been set to OFF, the connection object 61 has not been lent out. Therefore, the connection object lending unit 66 determines whether the in-suspension flag for the connection object 61 represented by variable i has been set to OFF (Step 228).

When the in-suspension flag has not been set to OFF, that is, the in-suspension flag has been set to ON, the connection object 61 cannot be lent out for some reason. As a result, the connection object lending unit 66 repeats the process from Step 222.

When in-use flag has been set to OFF, the connection object 61 is not in a state in which it cannot be lent out. Therefore, the connection object lending unit 66 sets in-use flag to ON (Step 229), and returns an affirmative response "OK" to the connection object lending requesting unit 42. The response includes the number of the connection object 61 as a return value (Step 230). As a result, the connection object lending requesting unit 42 is able to take a copy of the connection object 61 from the connection object pool 63.

The following is an explanation of the processing when the value stored in variable t exceeds the value for the total number of connection objects 61. This is a situation where an available connection object 61 has not been found after a search on all prepared connection objects 61. A connection object 61 is then added up to the maximum number of objects.

In other words, the connection object lending requesting unit 66 first determines whether or not the value stored in variable t is less than the value for the maximum number of objects stored in the connection object number storage unit 64 (Step 231).

When the value stored in variable t is less than the value for the maximum number of objects, the connection object generating unit 65 acquires information related to the connection destination from the queue manager 22 (Step 232). More specifically, the connection object generating unit 65 instructs the queue manager 22 to acquire the information on the connection destination by designating the cluster queue name and the way to determine the connection destination when the cluster queue as mentioned above is opened. In this way the queue manager 22 references the resource/connection destination table stored in the resource/connection destination table storage unit 51, selects a connection destination corresponding to the designated cluster queue name in a round-robin manner, and sends information related to the connection destination to the connection object generating unit 65.

Next, the connection object generating unit 65 generates a connection object 61 with the information related to the selected connection destination being set (Step 233). Then, information related to the generated connection object 61 is registered in the connection object management table 62 (Step 234). More specifically, a number next to the connection object number of the immediately preceding entry is registered as connection object number. In-use flag is registered as ON to lend the connection object 61 to a processing thread 21, and the in-suspension flag is registered as OFF to indicate that the connection object 61 is not in a state where it is unavailable. The channel name obtained from the queue manager 22 is also registered. The connection object generating unit 65 then adds 1 to the variable s indicating the total number of connection objects 61 (Step 235).

Afterwards, the connection object lending unit 66 returns an affirmative response "OK" to the connection object lending requesting unit 42. The response includes the number of the connection object 61 thus added as a return value (Step S236). As a result, the connection object lending requesting unit 42 is able to take a copy of the connection object 61 from the connection object pool 63.

When it has been determined in Step 231 that the value stored in variable t is equal to or greater than the value for the maximum number of objects, the connection object generating unit 65 returns a negative response "NG" to the connection object lending requesting unit 42 (Step S237).

Figure 15:
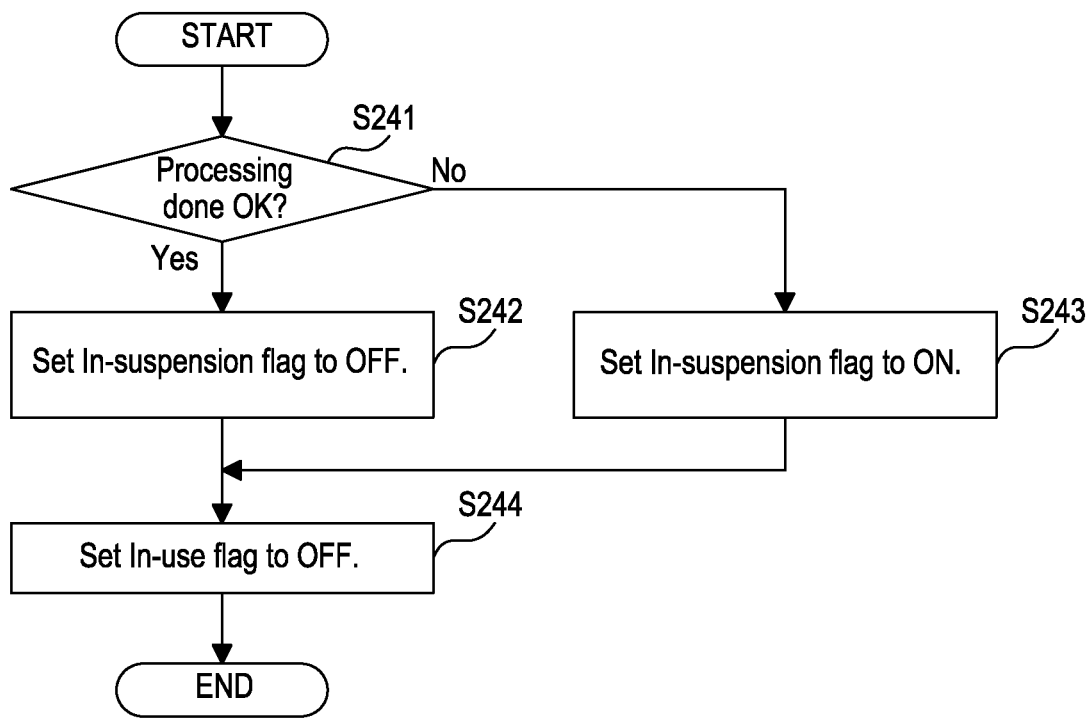
FIG. 15 is a flowchart showing the operations performed in the embodiment when the gateway accepts the return of a connection object.

FIG. 15 is a flowchart showing the operations performed in the embodiment when the gateway 20 accepts the return of a connection object 61.

When a connection object 61 is returned by the connection object returning unit 45, the connection object return accepting unit 67 first determines whether or not the processing was normally performed by the processing thread 21, based on information received from the connection object returning unit 45 along with the connection object 61 (Step 241). When the processing was normally performed by the processing thread 21, it means the processing was not timed out. When the processing was performed abnormally, it means the processing performed by the processing thread 21 was timed out.

When the processing was performed normally, the connection object return accepting unit 67 sets the in-suspension flag for the returned connection object 61 to OFF in the connection object management table 62 stored in the connection object pool 63 (Step 242).

When the processing was not performed normally but was performed abnormally, the connection object return accepting unit 67 sets the in-suspension flag for the returned connection object 61 to ON in the connection object management table 62 stored in the connection object pool 63 (Step 243).

Afterwards, the connection object return accepting unit 67 resets in-use flag for the returned connection object 61 to OFF in the connection object management table 62 stored in the connection object pool 63 (Step 244).

In the present embodiment, a copy of the connection object 61 is made and lent out when a connection object 61 stored in the connection object pool 63 is lent to a processing thread 21, and determining whether a connection object 61 has been lent to the processing thread 21, based on in-use flags in the connection object management table 62. However, when a connection object 61 stored in the connection object pool 63 is lent to a processing thread 21, the connection object 61 may be cut off from the connection object pool 63. Determining whether a connection object 61 has been lent to the processing thread 21 may be based on whether or not the connection object 61 is present in the connection object pool 63. When the processing thread 21 returns a connection object 61 in such an alternative, the connection object 61 cut off has to be returned to the connection object pool 63. Here, cutting off a connection object 61 from the connection object pool 63 is one example of a setting unit for setting a status allowing one item of connection information to be used exclusively for one processing unit, and therefore not for any other processing unit, and the return of a connection object 61 cut off to the connection object pool 63 is an example of a release unit for releasing the status having allowed the one item of connection information to be used exclusively for the one processing unit, and therefore not for any other processing unit.

In the present embodiment, connection objects 61 having a server 30 fixed as its transmission destination are prepared in a connection object pool 63, and processing requests are sent to the server 30 fixed as the transmission destination by the connection object 61 lent from the connection object pool 63. When a response is returned by the server 30, the connection object 61 is returned to the connection object pool 63. On the other hand, a connection object 61 whose transmission destination is a server 30 that slows down is not returned and cannot be reused. This can lower the possibility of a storm drain occurring in the event that a server 30 slows down or at a time between the occurrence and detection of failure in a server 30.

In the present embodiment, it is difficult to return a connection object 61 to the connection object pool 63 when the server 30 that is the transmission destination gets low in processing capability due to a load increase or a temporal drop in processing capacity (such as dump acquisition) at a transaction processing unit. This results in the number of connection objects 61 stored in the connection object pool 63 generally reflecting the surplus processing capacity of the transmission destinations. Thus, the load allocation is performed in accordance with the processing conditions of the servers 30. The present embodiment can be implemented to improve the connection pool function of existing products, and does not require any application changes.

Finally, a preferred computer hardware configuration will be explained for embodiment of the present invention.

Figure 16:
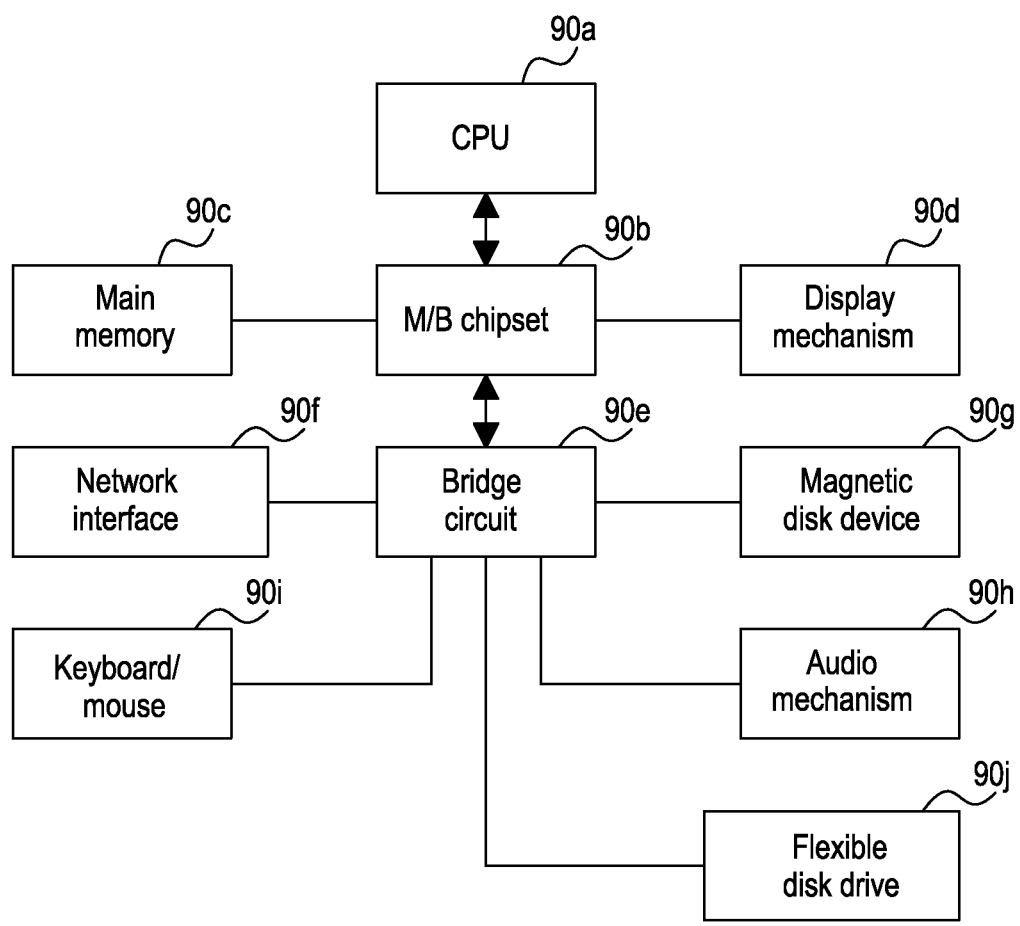
FIG. 16 is a diagram showing an example of a computer hardware configuration able to implement the embodiment of the present invention.

FIG. 16 is a diagram showing an example of such a computer hardware configuration. As shown in the drawing, the computer includes a central processing unit (CPU) 90*a* serving as a computing means, a main memory 90*c* connected to the CPU 90*a* via a motherboard (M/B) chip set 90*b*, and a display mechanism 90*d* connected to the CPU 90*a* via the same M/B chip set 90*b*. A network interface 90*f*, magnetic disk device (HDD) 90*g*, audio mechanism 90*h*, keyboard/mouse 90*i*, and flexible disk drive 90*j* are also connected to the M/B chip set 90*b* via a bridge circuit 90*e*.

In FIG. 16, the various components are connected via a bus. For example, the CPU 90*a* and the M/B chip set 90*b*, and the M/B chip set 90*b* and the main memory 90*c* are connected via a CPU bus. Also, the M/B chip set 90*b* and the display mechanism 90*d* may be connected via an accelerated graphics port (AGP). However, when the display mechanism 90*d* includes a PCI Express compliant video card, the M/B chip set 90*b* and the video card are connected via a PCI Express (PCIe) bus. Also, PCI Express can be used as the network interface 90*f* if, for example, it is connected to the bridge circuit 90*e*. Examples of magnetic disk devices 90*g* include a serial AT attachment (ATA), a parallel-transmission ATA, and a peripheral components interconnect (PCI). The keyboard/mouse 90*i* and the flexible disk drive 90*j* can use a universal serial bus (USB).

The present invention may be entirely implemented by hardware or by software. It may also be implemented by a combination of both hardware and software. The present invention may also be implemented as a computer, data processing system, or computer program. The computer program may be stored and provided on a computer-readable medium. Here, the medium may be electronic, magnetic, optical, electromagnetic, infrared, or a semiconductor system (device or equipment). Examples of computer-readable media include semiconductors, solid-state storage devices, magnetic tape, removable computer diskettes, random-access memory (RAM), read-only memory (ROM), rigid magnetic disks, and optical disks. Examples of optical disks at the present time include compact disk read only memory (CD-ROM) disks, compact disk read/write (CD-R/W) disk, and DVDs.

The present invention was explained above using an embodiment, but the technical scope of the present invention is not limited in any way by this embodiment. It should be clear to a person skilled in the art that various modifications and substitutions can be made without departing from the spirit and scope of the present invention.

REFERENCE SIGNS LIST

10: Terminal apparatus
20: Gateway
21: Processing thread
22, 32: Queue manager
23: Connection object managing unit
30: Server
31: Transaction processing unit
41: Request receiving unit
42: Connection object lending requesting unit
43: Request transmitting unit
44: Response receiving unit
45: Connection object return unit
46: Response transmitting unit
51: Resource/connection destination table storage unit
61: Connection object
62: Connection object management table
63: Connection object pool
64: Connection object number storage unit
65: Connection object generating unit
66: Connection object lending unit
67: Connection object return accepting unit
68: Channel failure detecting unit
69: Channel recovery detecting unit

What is claimed is:

1. A system for allocating a request from a requesting apparatus for processing to any one of a plurality of processing systems capable of performing the processing, the system comprising:

a storage unit for storing at least one item of connection information for each of the processing systems for connection thereto;

a request receiving unit for receiving a request from the requesting apparatus;

a setting unit for setting, in response to receiving a request by the request receiving unit, a status related to one item of the connection information stored in the storage unit for connection to one of the processing systems, said status allowing the one item of connection information to be used exclusively for the request, and therefore not for any other request, and wherein the setting unit is capable of setting, in response to the detection of failure of the processing by a certain processing system among the plurality of processing systems, a status related to each of one or more connection objects stored in the storage unit for connection to the processing system, said status indicating the one or more connection objects should not be used by any one of the plurality of processing units;

a request transmitting unit for transmitting the request received by the request receiving unit to the one processing system by using the one item of connection information;

a response receiving unit for receiving a response denoting a result of the processing from the one processing system;

a releasing unit for releasing, responsive to the response receiving unit receiving the response, the status related to the one item of connection information, said status having allowed the one item of connection information to be used exclusively for the request, and therefore not for any other request, and wherein the releasing unit is capable of releasing the status related to each of the one or more connection objects in response to the detection of resolution or mitigation of the failure of the processing by the processing systems, said status having indicated the one or more connection objects should not be used by any one of the plurality of processing units; and a response transmitting unit for transmitting, responsive to the response receiving unit receiving the response, the response to the requesting apparatus.

2. A system for controlling allocation by an allocating apparatus for allocating a request from a requesting apparatus for processing to any one of a plurality of processing systems capable of performing the processing, the system comprising:

a storage unit for storing one or more connection objects for each of the processing systems for connection thereto;

a plurality of processing units each receiving a request from the requesting apparatus, transmitting the received request to one processing system by using the one or more connection objects, receiving a response denoting a result of the processing from the one processing system, and transmitting the response to the requesting apparatus;

a setting unit for setting, in response to receiving a request by a processing unit of the plurality of processing units, a status related to the one or more connection objects stored in the storage unit for connection to one of the processing systems, said status allowing the one or more connection objects to be used exclusively for the processing unit, and therefore not for any other processing unit, wherein setting a status includes at least one of setting a flag to an on setting within a connection object management table, and setting a flag to an off setting within a connection object management table, and wherein the setting unit is capable of setting, in response to the detection of failure of the processing by a certain processing system among the plurality of processing systems, a status related to each of one or more connection objects stored in the storage unit for connection to the processing system, said status indicating the one or more connection objects should not be used by any one of the plurality of processing units; and a releasing unit for releasing, when the processing unit receives the response, the status related to the one item of connection information, said status having allowed the one or more connection objects to be used exclusively for the processing unit, and therefore not for any other processing unit, and wherein the releasing unit is capable of releasing the status related to each of the one or more connection objects in response to the detection of resolution or mitigation of the failure of the processing by the processing systems, said status having indicated the one or more connection objects should not be used by any one of the plurality of processing units.

3. The system according to claim 2, wherein the setting apparatus is capable of setting, when a processing unit among the plurality of processing systems has not received a response from another processing unit among the plurality of the processing units within a given amount of time, a status related to each of the one or more connection objects stored in the storage unit for connection to the processing system, said status indicating the one or more connection objects should not be used by any one of the plurality of processing units.

4. The system according to claim 2 further comprising an adding unit for adding, in response to receiving the request from a processing unit when each of the one or more connection objects stored in the storage unit is being used by any one of the plurality of processing units, to the storage unit the one or more connection objects for connection to the one processing system.

5. The system according to claim 2, wherein the setting apparatus is capable of setting, when a processing unit among the plurality of processing systems has not received a response from another processing unit among the plurality of the processing units within a given amount of time, a status related to each of the one or more connection objects stored in the storage unit for connection to the processing system, said status indicating the one or more connection objects should not be used by any one of the plurality of processing units.

6. The system according to claim 2 further comprising an adding unit for adding, in response to receiving a request from a processing unit when each of the one or more connection objects stored in the storage unit is being used by any one of the plurality of processing units, to the storage unit the one or more connection objects for connection to the one processing system.

7. The system according to claim 3 further comprising an adding unit for adding, in response to receiving a request from a processing unit when each of the one or more connection objects stored in the storage unit is being used by any one of the plurality of processing units, to the storage unit the one or more connection objects for connection to the one processing system.

8. A method for allocating a request from a requesting apparatus for processing to any one of a plurality of processing systems capable of performing the processing, the method comprising the steps of:

storing at least one or more connection objects for each of the processing systems for connection thereto;

receiving a request from the requesting apparatus;

setting, in response to the detection of failure of the processing by a certain processing system among the plurality of processing systems, a status related to each of one or more connection objects stored in the storage unit for connection to the processing system, said status indicating the one or more connection objects should not be used by any one of the plurality of processing units said status allowing the one or more connection objects to be used exclusively for the request, and therefore not for any other request, wherein setting a status includes at least one of setting a flag to an on setting within a connection object management table, and setting a flag to an off setting within a connection object management table;

transmitting the received request to the one processing system by using the one or more connection objects;

receiving a response denoting a result of the processing from the one processing system;

releasing the status related to each of the one or more connection objects in response to the detection of resolution or mitigation of the failure of the processing by the processing systems, said status having indicated the one or more connection objects should not be used by any one of the plurality of processing units; and responsive to receiving the response, transmitting the response to the requesting apparatus.

9. A computer program product for allocating a request from a requesting apparatus for processing to any one of a plurality of processing systems capable of performing the processing, the computer program product comprising: one or more computer-readable storage devices and program instructions stored on at least one of the one or more computer-readable storage devices, the program instructions comprising:

program instructions to store at least one item of connection information for each of the processing systems for connection thereto;

program instructions to receive a request from the requesting apparatus, program instructions to transmit the received request to one processing system of a plurality of processing units by using one item of connection information, program instructions to receive a response denoting a result of the processing from the one processing system, and program instructions to transmit the response to the requesting apparatus;

program instructions to set, in response to the detection of failure of the processing by a certain processing system among the plurality of processing systems, a status related to each of one or more connection objects stored in the storage unit for connection to the processing system, said status indicating the one or more connection objects should not be used by any one of the plurality of processing units, said status allowing the one item of connection information to be used exclusively for the processing unit, and therefore not for any other processing unit, wherein the program instructions to set a status includes at least one of program instructions to set a flag to an on setting within a connection object management table, and program instructions to set a flag to an off setting within a connection object management table; and program instructions to release, when the processing unit receives the response, the status related to the one item of connection information, said status having allowed the one item of connection information to be used exclusively for the processing unit, and therefore not for any other processing unit program instructions to release the status related to each of the one or more connection objects in response to the detection of resolution or mitigation of the failure of the processing by the processing systems, said status having indicated the one or more connection objects should not be used by any one of the plurality of processing units.

* * * * *